(12) United States Patent
Ridder

(10) Patent No.: US 10,059,579 B1
(45) Date of Patent: Aug. 28, 2018

(54) LIQUID DISPENSING SYSTEM

(71) Applicant: Patrick Ridder, Napa, CA (US)

(72) Inventor: Patrick Ridder, Napa, CA (US)

( * ) Notice: Subject to any disclaimer, the term of this patent is extended or adjusted under 35 U.S.C. 154(b) by 0 days.

(21) Appl. No.: 14/254,211

(22) Filed: Apr. 16, 2014

Related U.S. Application Data

(60) Provisional application No. 61/812,444, filed on Apr. 16, 2013.

(51) Int. Cl.
*B67D 1/00* (2006.01)
*B67D 1/10* (2006.01)

(52) U.S. Cl.
CPC ............. *B67D 1/0007* (2013.01); *B67D 1/00* (2013.01); *B67D 1/10* (2013.01); *B67D 2001/0091* (2013.01); *B67D 2001/0097* (2013.01)

(58) Field of Classification Search
CPC ............. B67D 7/30; B67D 2001/0092; B67D 2001/0481; B67D 7/02; B67D 7/025; B67D 7/08; B67D 7/0211; B67D 7/0277; B67D 7/0283; B67D 7/301; B67D 7/22; B67D 7/26; B67D 7/16; B67D 7/163; B67D 7/166; B67D 7/18; B67D 1/0007; B67D 1/00; B67D 1/10; B67D 1/0425; B67D 2001/0091; B67D 2001/0097
USPC ..... 222/1, 14, 282, 285–286, 309–310, 204, 222/416; 141/2, 25–27, 21
See application file for complete search history.

(56) References Cited

U.S. PATENT DOCUMENTS

| | | | | |
|---|---|---|---|---|
| 417,576 | A * | 12/1889 | Muller | B67D 1/103 222/155 |
| 486,760 | A * | 11/1892 | Bumann | B67D 1/0425 222/204 |
| 503,232 | A * | 8/1893 | Franklin | B67D 1/0425 137/148 |
| 1,126,167 | A * | 1/1915 | Wyckoff | B67D 7/303 221/103 |
| 1,291,528 | A * | 1/1919 | hull | 222/14 |
| 1,318,718 | A * | 10/1919 | belk | 417/429 |
| 1,524,519 | A * | 1/1925 | Joncha | B67D 7/60 222/153.13 |
| 1,681,866 | A * | 8/1928 | McCauley | 222/14 |
| 2,534,504 | A * | 12/1950 | Engstrom | B05B 11/3005 222/180 |
| 2,730,958 | A * | 1/1956 | Nelson | B67D 7/60 222/109 |

(Continued)

FOREIGN PATENT DOCUMENTS

WO 2013005159 A1 1/2013

*Primary Examiner* — Nicholas J Weiss
*Assistant Examiner* — Andrew P Bainbridge

(57) ABSTRACT

A system for manually dispensing liquid from bulk container assembly into a smaller container using a manually operated pump assembly comprising a bulk container for maintaining liquid being pumped from a sealed bulk container, a metering pump assembly having a fluid interconnection with the bulk container, a rack and pinion gear drive assembly for moving an interconnected handle between operating positions for filling and emptying a metering chamber with the accurate amount of the predetermined desired volume of fluid to be pumped. A nozzle is provided for emptying the metering chamber to a second container having a size comparable to the amount of desired liquid being pumped. A method for dispensing liquid from a bulk container to a smaller container is also provided.

15 Claims, 11 Drawing Sheets

(56) References Cited

U.S. PATENT DOCUMENTS

| | | | |
|---|---|---|---|
| 2,759,633 A | | 8/1956 | Ross |
| 2,991,916 A | | 7/1961 | Kish |
| 3,221,931 A | | 12/1965 | Porter |
| 3,830,405 A | | 8/1974 | Jaeger |
| 3,933,272 A | * | 1/1976 | Lamb et al. ................ 222/1 |
| 4,327,782 A | | 5/1982 | McKibben et al. |
| 4,440,319 A | | 4/1984 | Nitchman et al. |
| 4,624,391 A | * | 11/1986 | Shannon ............ B67D 1/04 222/129 |
| 4,921,135 A | | 5/1990 | Pleet |
| 5,062,548 A | | 11/1991 | Hedderick et al. |
| 5,273,186 A | * | 12/1993 | Widmer .................. 222/50 |
| 5,649,647 A | * | 7/1997 | Kodarar ............ B67D 7/0205 222/204 |
| 5,747,709 A | * | 5/1998 | Oshikubo ........... B01L 3/0234 222/287 |
| 6,012,903 A | | 1/2000 | Boelkins |
| 6,045,010 A | * | 4/2000 | Patterson .................. 222/394 |
| 6,164,497 A | * | 12/2000 | Chia .................. B01F 15/0237 222/309 |
| 7,533,701 B2 | * | 5/2009 | Gadzic ................... B67D 7/02 141/302 |
| 7,641,076 B2 | * | 1/2010 | Nishida ............... B67D 1/0004 141/18 |
| 7,810,679 B2 | | 10/2010 | Wauters et al. |
| 8,216,527 B2 | * | 7/2012 | Dzuong ............... B01L 3/0217 222/14 |
| 8,561,656 B2 | | 10/2013 | Eginton et al. |
| 2011/0132922 A1 | | 6/2011 | Summers et al. |
| 2013/0264360 A1 | | 10/2013 | Astolfi |

\* cited by examiner

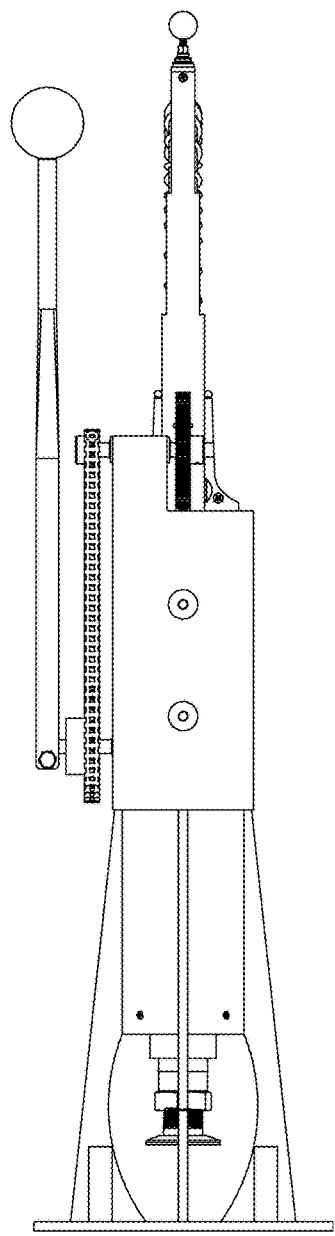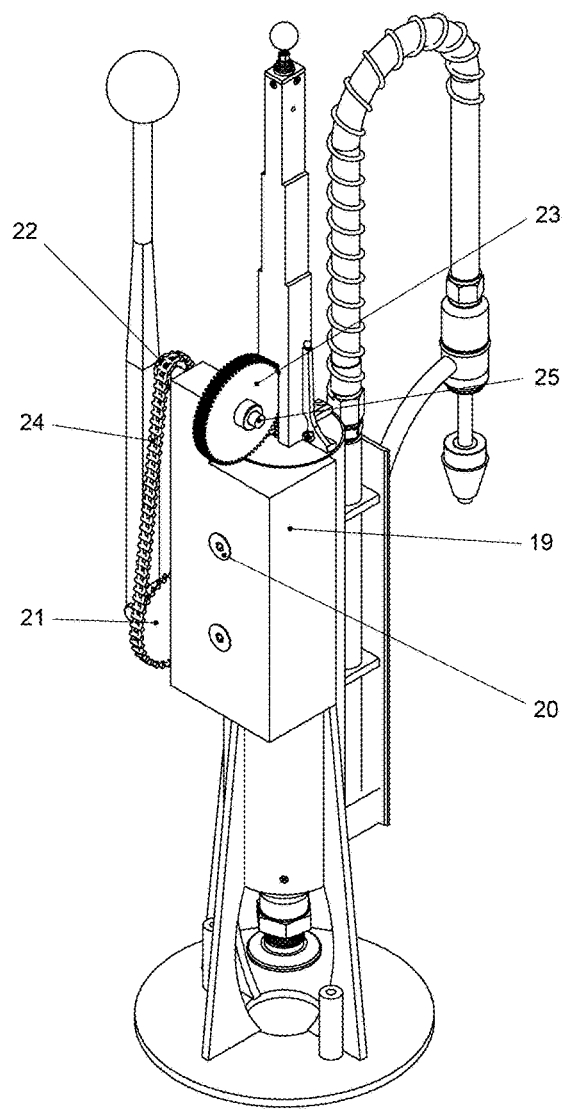
Figure 2
Figure 3

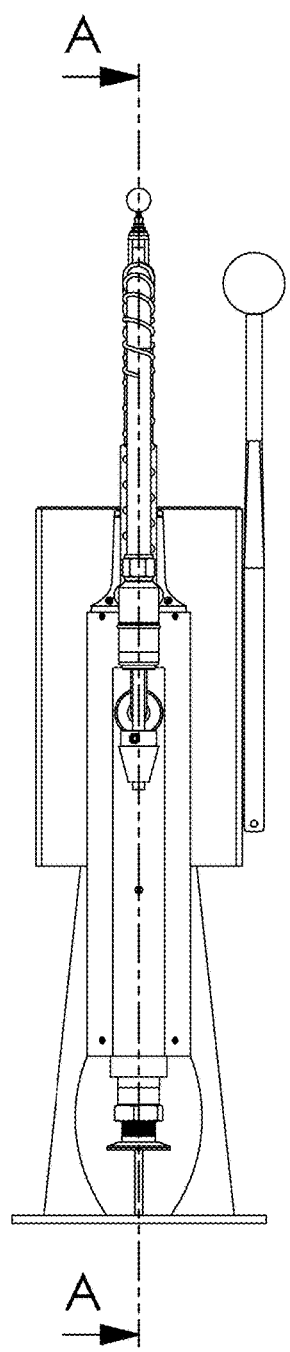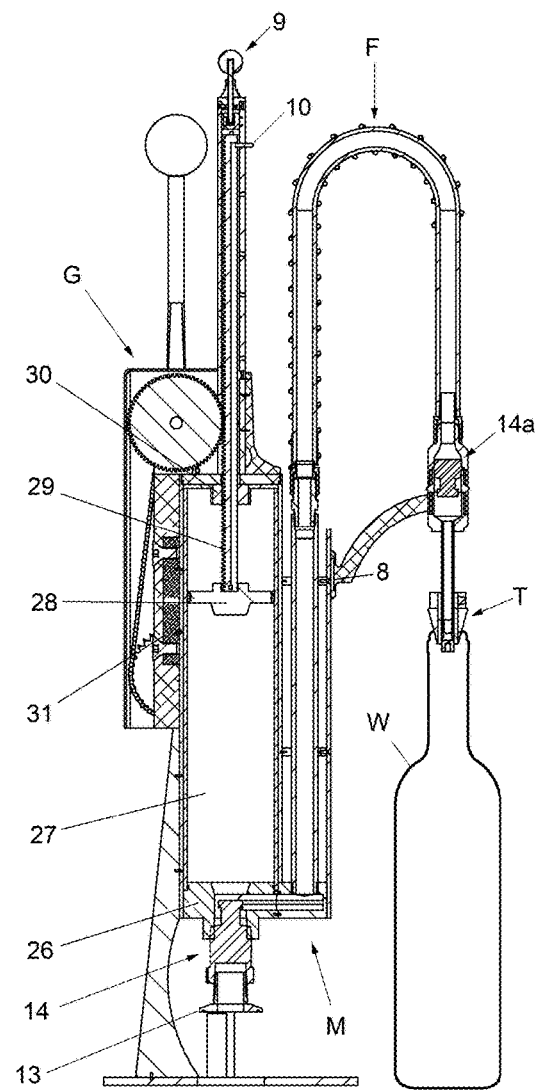
Figure 4                    Figure 4A

Figure 9
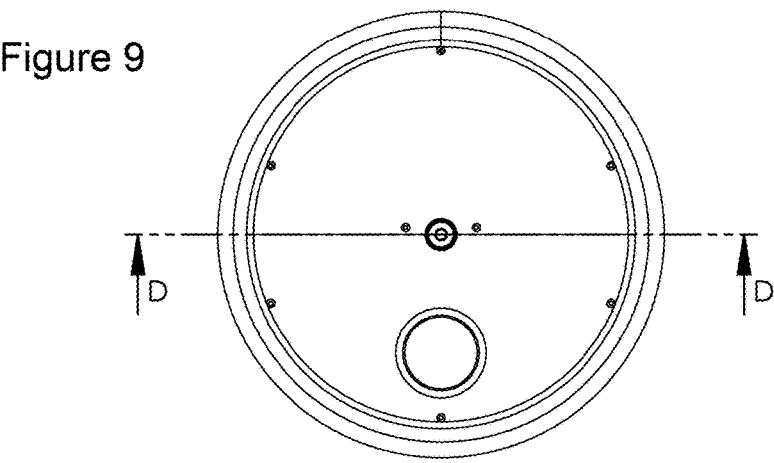
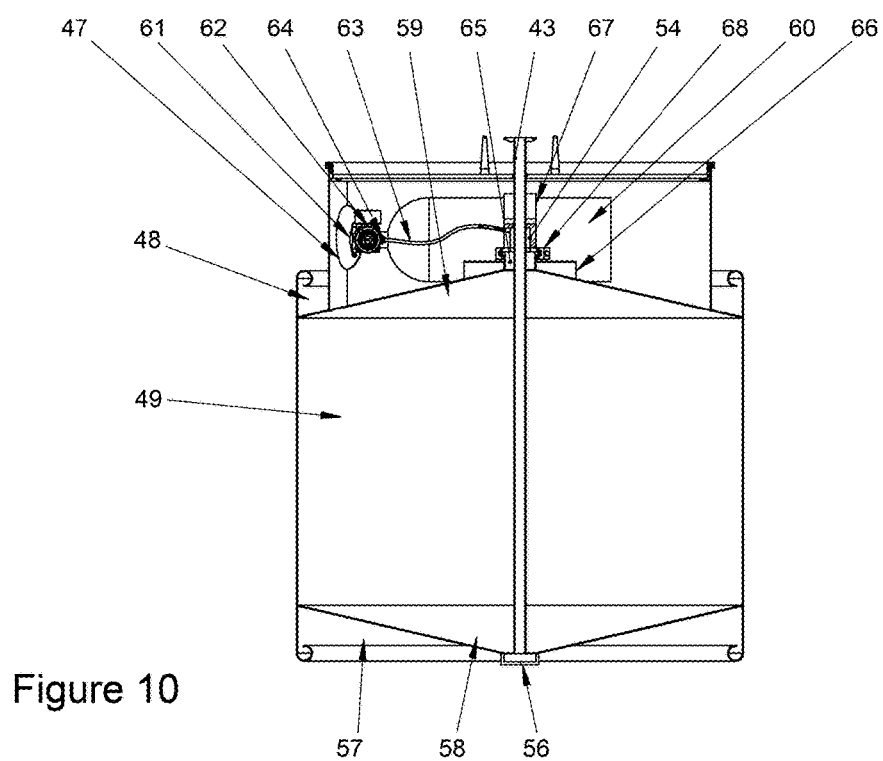
Figure 10
SECTION D-D

LIQUID DISPENSING SYSTEM

CROSS REFERENCE TO RELATED APPLICATION

This application claims priority from U.S. Provisional Patent Application No. 61/812,444 filed Apr. 16, 2013, the entirety of which is incorporated herein by reference.

FIELD OF INVENTION

This application is directed to a unique system for dispensing precise, predetermined amounts of liquids from a bulk container into smaller containers, and a method for such dispensing.

BACKGROUND

Wine, beer and other liquid beverages are traditionally dispensed from and sold in glass bottles. Due to the increasing expense and negative environmental impact of using glass containers, it is becoming increasingly desirable to provide consumers with the option to purchase liquid beverages in their own reusable containers from bulk storage containers. Unfortunately, legal and tax requirements related to the dispensing and purchase of alcoholic beverages requires the accurate dispensing of specific amounts of such liquid beverages very important. Additional issues related to the storage and dispensing of liquid beverages from bulk containers may include theft or misuse, as well as the necessity of ensuring the quality of the liquid beverages is preserved for later consumption.

SUMMARY

The present System consists of a hand operated positive displacement pump that is mounted to a bulk container, and a method for dispensing. The pump is able to dispense liquids from the bulk container in precise, predetermined volumes into smaller containers. The bulk container is designed to allow its contents to be held for extended periods of time without risk of spoilage from oxidation or contamination. Alternative types of bulk containers are utilized depending upon the preference of the dispenser. One type contains a liquid bulk liner fitted with a spout to which the positive displacement pump is attached. The second type operates without a liquid bulk liner, is self-sealing and has the positive displacement pump mounted directly to it. Both systems allow an operator to dispense liquids directly from the bulk container into smaller vessels in precise, predetermined volumes.

The System is preferably designed for use within the retail food business. The System will allow a retailer to dispense from a bulk container, liquids such as wine or oil into smaller containers supplied by either the retailer or the consuming customer. Such containers could be "re-usable" and/or returnable. They could bear labels that describe their contents and contain whatever information the retailer deems appropriate or is required by applicable law.

Unlike other prior systems, the present manually operated System requires no compressed gas to drive the liquid from the bulk container through the dispensing device into re-usable containers. The System uses a positive displacement pump that, when primed, draws the liquid product into a metering chamber and out through a fill spout. There are no flow meters to calibrate; precise fill levels are achieved by placing a stainless steel pin in the hole marked for the size container that is to be filled. There are no electronics; all moving parts are driven by the single stroke of a handle pulled down and then returned to the upright (default) position. Hence, there is no need for electrical wall sockets. The pump can be installed and operational in less than one minute. It can operate in concert with multiple sizes of bulk containers. It can be removed in less than a minute and purged and cleaned in about the same amount of time.

By virtue of its unique features, the System creates the opportunity for retail customers to purchase their own re-usable containers. These containers can then be filled and refilled by the System from bulk containers found in the retail setting. This method of purchasing bulk liquids eliminates unnecessary packaging and transportation costs and significantly reduces a customer's "carbon footprint".

These and other features and advantages of the invention will become apparent in the detailed description and claims that follow, taken in conjunction with the accompanying drawings.

DESCRIPTION OF THE DRAWINGS

FIG. 2 is a partial rear view of the pump assembly FIG. 1.

FIG. 3 is a partial perspective rear view of the pump assembly of FIG. 2.

FIG. 4 is a front plan view of the pump assembly of FIG. 1.

FIG. 4A is a schematic, partial cut-away side view taken along the line A-A of FIG. 4, with the pump assembly in a default position, with the handle in the up position and the metering chamber in an empty condition.

FIG. 9 is a top view of the bulk container or barrel assembly of FIG. 8.

FIG. 10 is a partial schematic cut-away view of the barrel assembly taken along the line D-D of FIG. 9.

DETAILED DESCRIPTION

Figure 1:
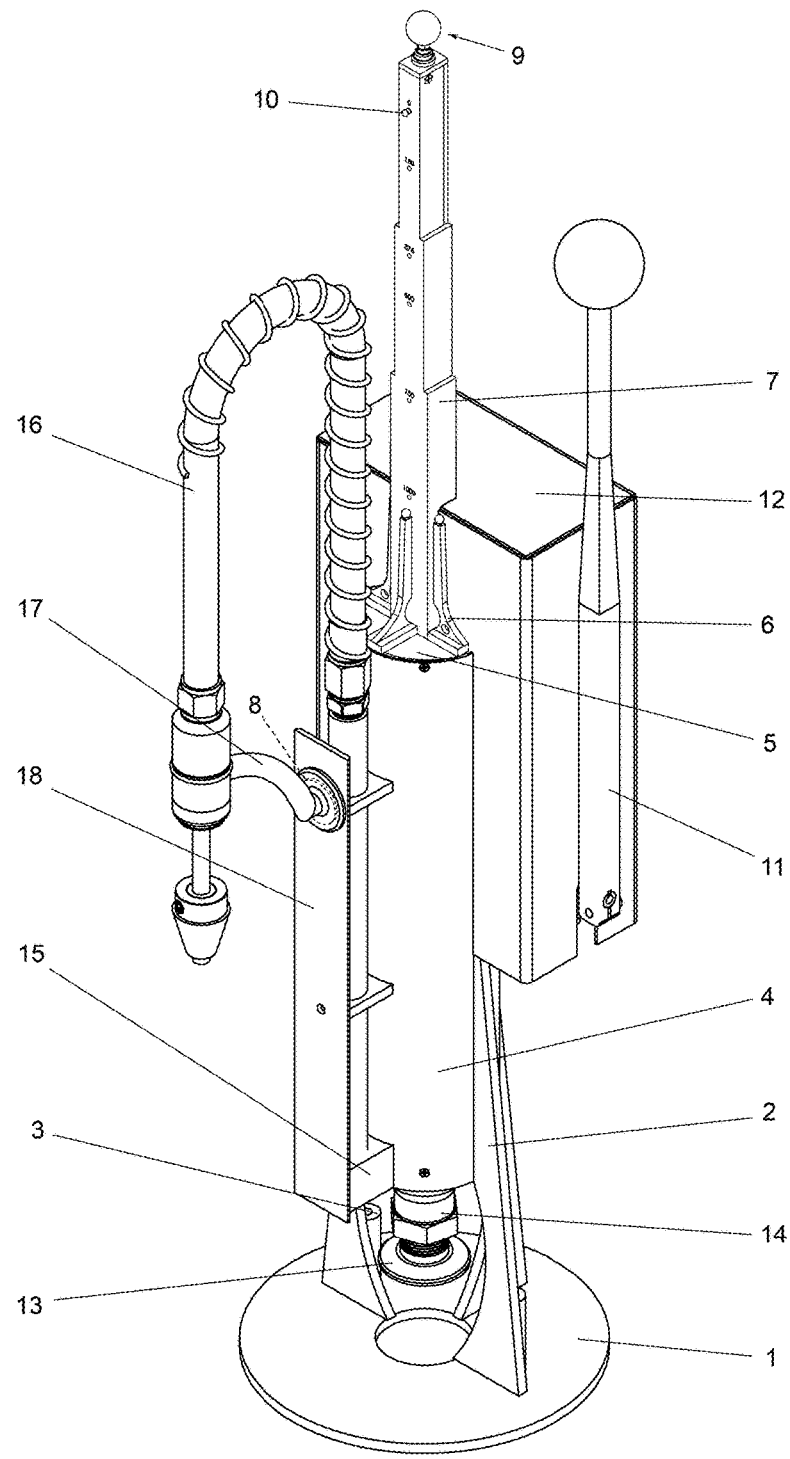
FIG. 1 is a perspective front view of the pump assembly of the System of the present application.
Figure 6:
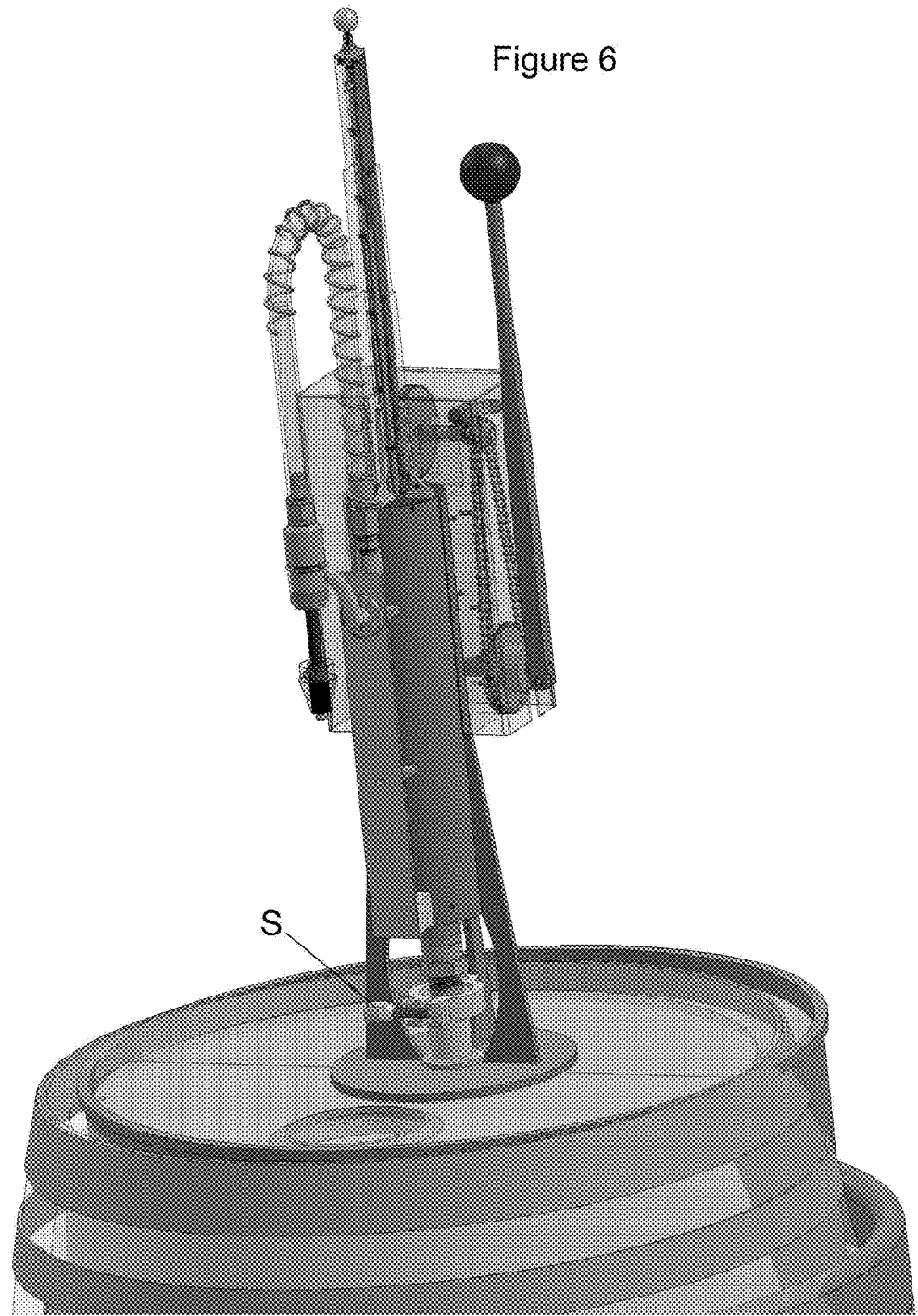
FIG. 6 is a partial schematic view of the pump assembly mounted on a barrel assembly.
Figure 11:
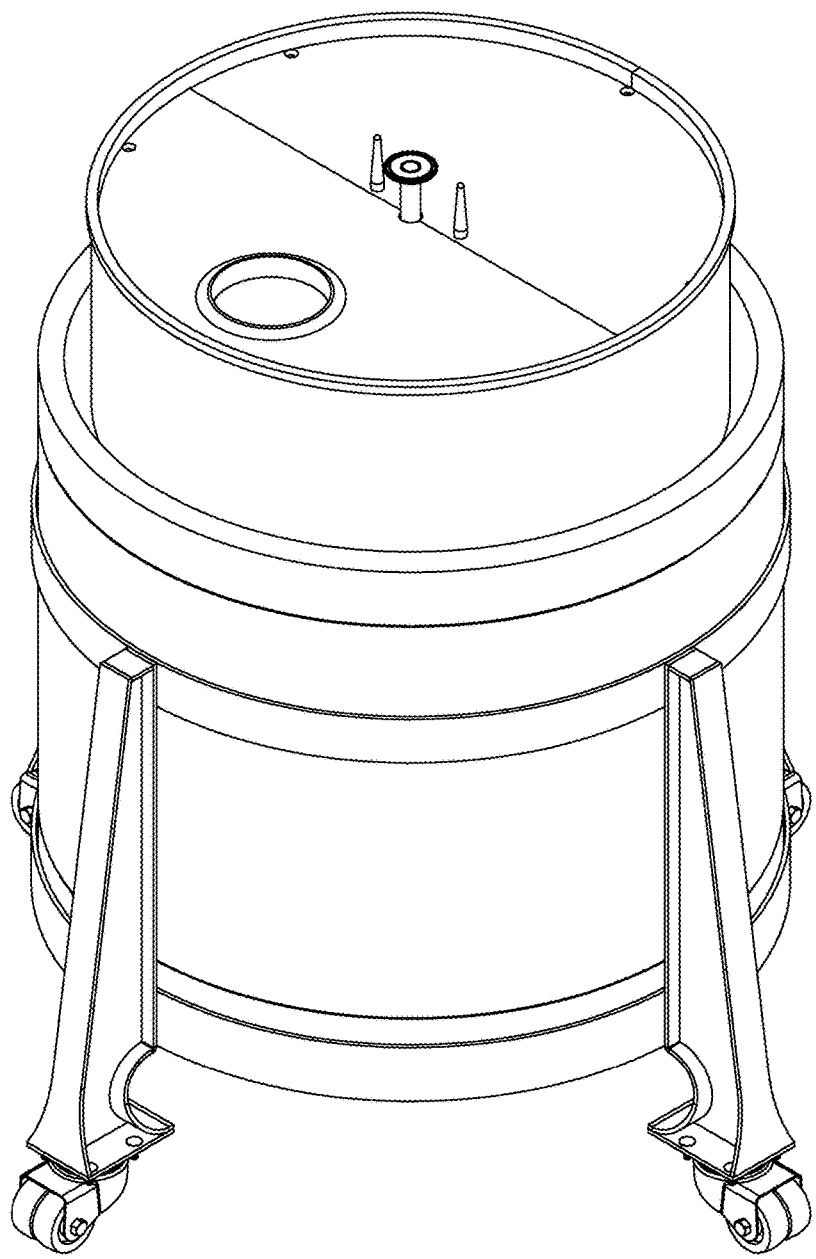
FIG. 11 is a perspective front view of the barrel assembly within a movable stand.
Figure 13:
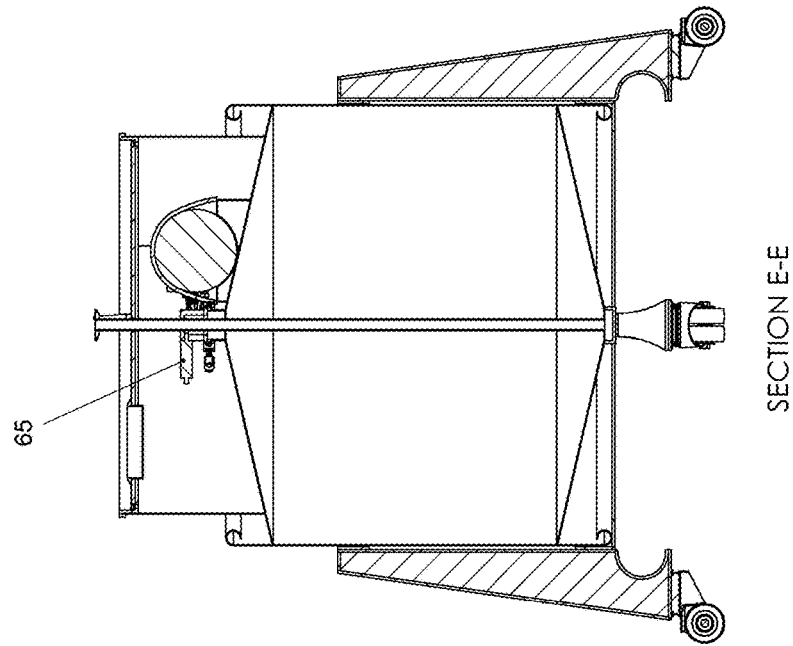
FIG. 13 is a partial schematic cut-away view of the barrel assembly and stand taken along the line E-E of FIG. 12.
Figure 12:
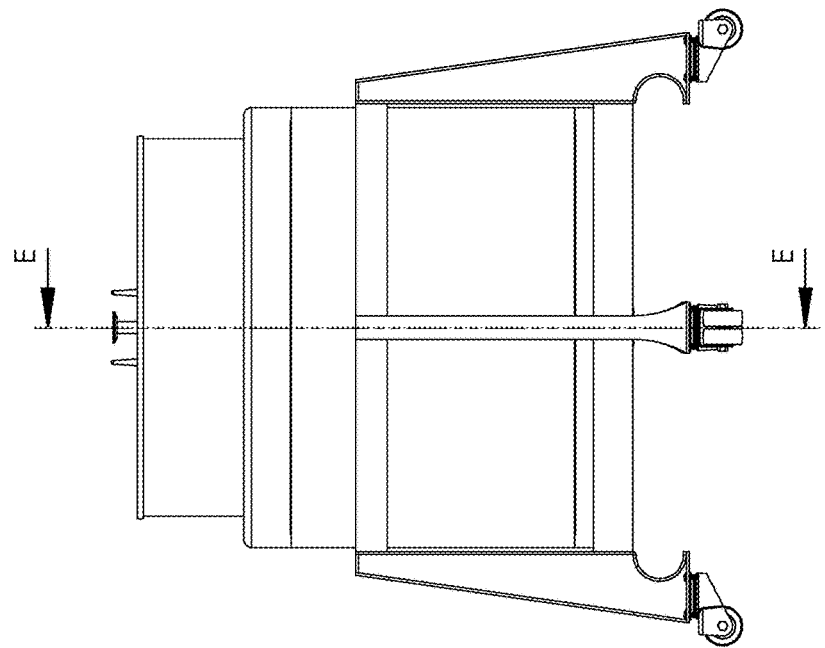
FIG. 12 is a front plan view of the barrel assembly and stand of FIG. 11.
Figure 14:
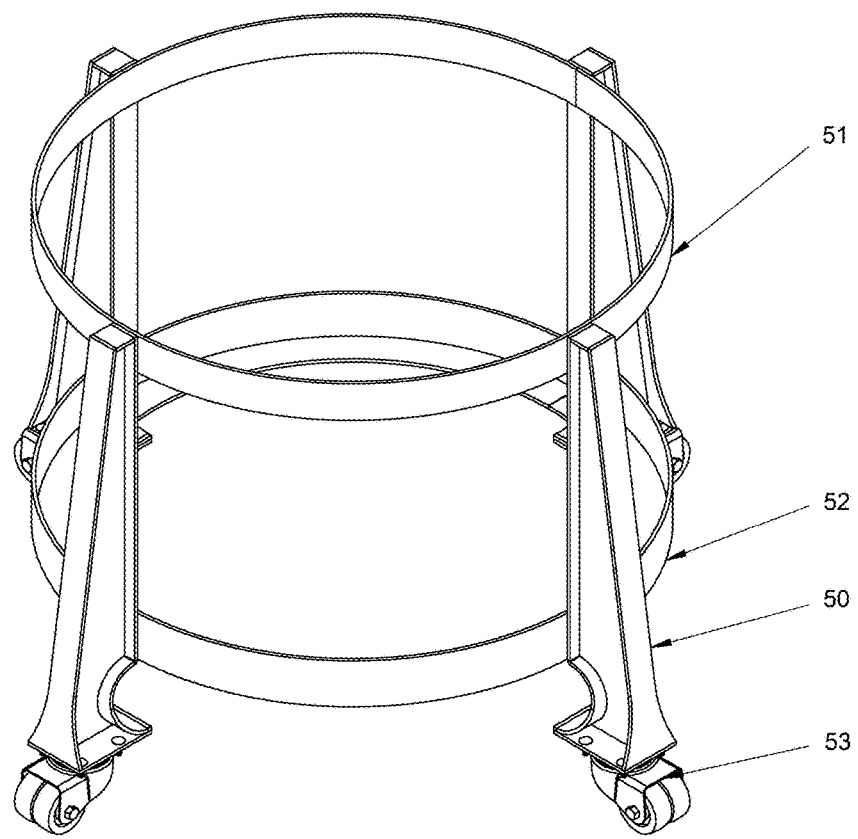
FIG. 14 is a perspective front view of the movable stand of FIG. 11.

A liquid dispenser system S of the present application includes a manually operated positive displacement component pump assembly P and a bulk container or barrel assembly B, in FIGS. 1 and 11, respectively, and assembled in FIG. 6. The barrel assembly B may be of varying sizes, and may capture a corresponding size of liquid bulk liner (not shown) for holding the liquid to be dispensed, or, as shown in FIG. 11, the barrel assembly may be provided without a disposable liquid liner, such that no aspects of the filling, dispensing and refilling of the barrel assembly shown surrender anything to a landfill.

As shown in FIGS. 8-13, the main barrel 49 may be constructed entirely of stainless steel, or of other materials suitable for storage of liquid food commodities. The productive life of such barrels 49 is preferably measured in decades. Additionally, most liquid food commodities may be stored within such barrels 49 for multiple months. The storage and preservation of such liquid food commodities within such barrels 49 is equal to or greater than other traditional methods, for example, glass. Additionally, such barrels may be provided in connection with the present System in a variety of desired sizes, but for example, greater, less than or equal to 60 gallons.

Figure 8:
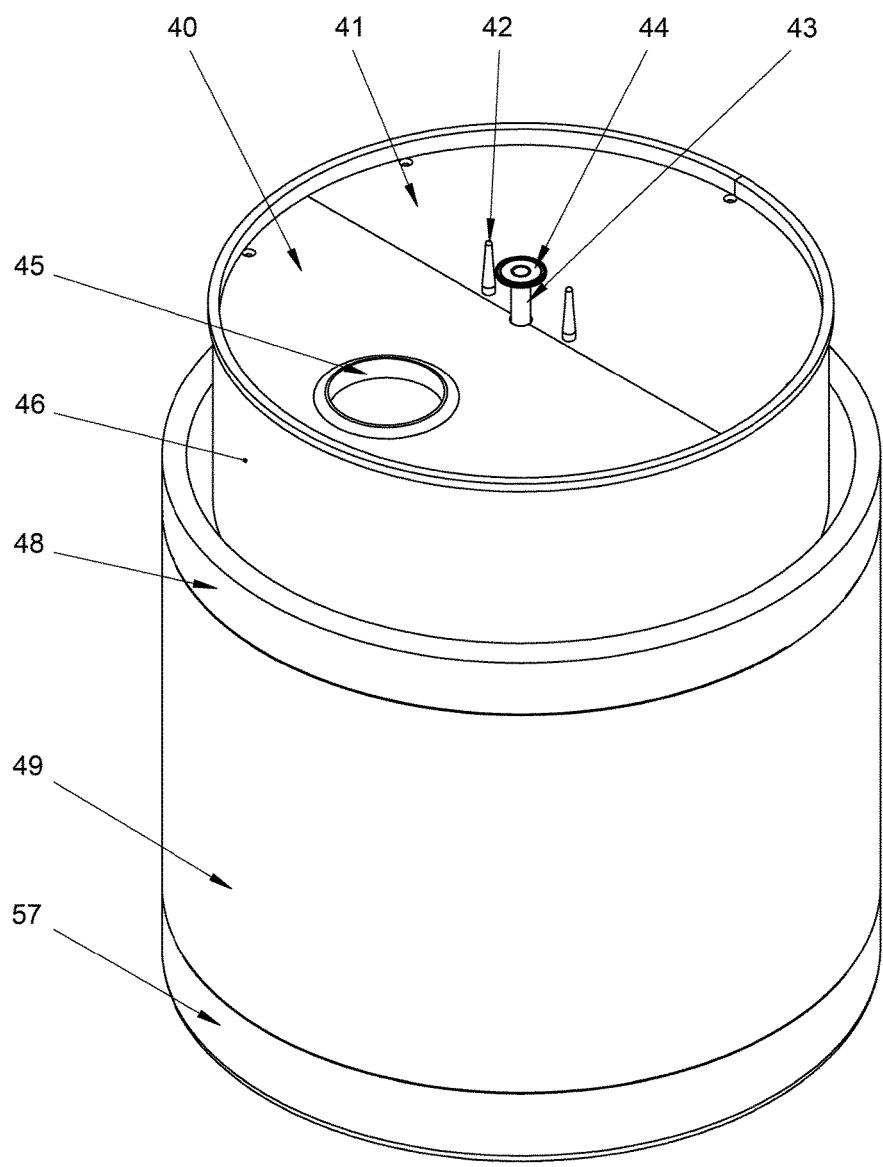
FIG. 8 is a bulk container or barrel assembly, having no liner, of the System of the present application.

In FIGS. 8 and 10, the barrel assembly B is shown to include the main barrel 49 with a top skirt 48 having a chimb for easy carrying, a top dome 59, a bottom skirt 57 having a chimb for easy carrying and a bottom dome 58 having a dimple 56. A cylinder housing 46 surrounds and substantially encloses a small cylinder 60 of inert gas (Nitrogen or Argon) that is used to maintain atmospheric pressure within the head space of the main barrel 49. Such a gas cylinder is only provided with those barrels of liquid foods that require an inert gas to prevent oxidization or other spoilage concerns. The gas cylinder 60 is supported with the cylinder housing 46 on a platform 66 by a strap 67. An access opening 47 is provided to access a gas valve 61 interconnected with the gas cylinder 60 via a gas regulator 62, coupled at gas line coupling 64 with a gas line 63. The two-stage gas regulator 62 is preferably set to approximately 1 PSI, such that gas is released into the head space of the main barrel 49 as the liquid is drawn down and out of the barrel, enabling an air-tight barrel environment. Gas is permitted into the barrel via an intake port 54. The intake port 54 permits the spear or tube 43 to extend through a single orifice formed in the top dome 59 of the barrel for removal of liquid, and inert gas to be supplied into the barrel. The intake port and a pressure relief valve 65 are secured to the barrel at a sanitary clamp 68. The pressure relief valve 65 is set at approximately 10 PSI.

A pump platform 40, 41 forms a top covering for the cylinder housing 46. The spear or tube 43, having a top ferrule 44, extends above the pump platform and cylinder housing 46. The spear 43 is positioned down through the intake port 54 within the main barrel 49 to draw liquid from the very bottom of the barrel up into the pump assembly P. The present barrel assembly B design allows for virtually all the liquid food commodity to be dispensed using the pump assembly P, as only approximately 50 ml remains within the dimple 56. As shown in FIGS. 11-14, the main barrel 49 may be supported on a movable barrel stand having legs 50, a top band 51 and a base 52. Casters 53 are provided on each leg for easy movement of the present System during transportation, use and/or storage with a retail establishment environment.

Mounted on the pump platform 41 are guide posts or bayonet inserts 42 to enable proper alignment of the pump assembly P to the bulk container B. A drip tray 45 is supported within the pump platform 42 for catching any liquid spills resulting during the filling of a small container W from the bulk container B.

To fill the barrel 49, a sanitizing process, preferably using hot pressurized water and an ozone wash, is first conducted. Thereafter, the barrel assembly may be placed in the barrel stand. The gas cylinder 60, valve 61 and regulator 62 are all positioned on the cylinder platform 66, and secured by the strap 67 within the cylinder housing 47, interconnected with the intake port 54. A filling wand (not illustrated) from a liquid supply container is lowered into the barrel 49 through the bottom ferrule 55, and liquid is pumped into the barrel. Once the filling wand is removed, the stainless steel spear 43 is lowered into the barrel. The liquid within the barrel may be topped off using fluid from a graduated cylinder. A sanitary gasket, clamp and cover are then used to seal spear and ferrule for any transportation. A ferrule 13 of the pump assembly P may also be provided with a sanitary gasket, clamp and cover for independent transportation of the barrel assembly B and pump assembly P. The pump platforms 40, 41 are then installed and the barrel assembly B may be either stored or delivered, as necessary.

When desired, the pump assembly P is provided for attachment to the barrel assembly B at the ferrule 13. The sanitary clamps and covers are removed. The pump assembly is lowered to engage with the guide posts 3, shown in FIGS. 1-3, into engagement with the guide inserts 42 of the bulk container B, until the top ferrule 44 of the bulk container B and the ferrule 13 of the pump assembly P are engaged in aligned position to enable fluid communication between the assemblies. The ferrules are secured together using a sanitary gasket and clamp S, shown in FIG. 6.

Figure 7:
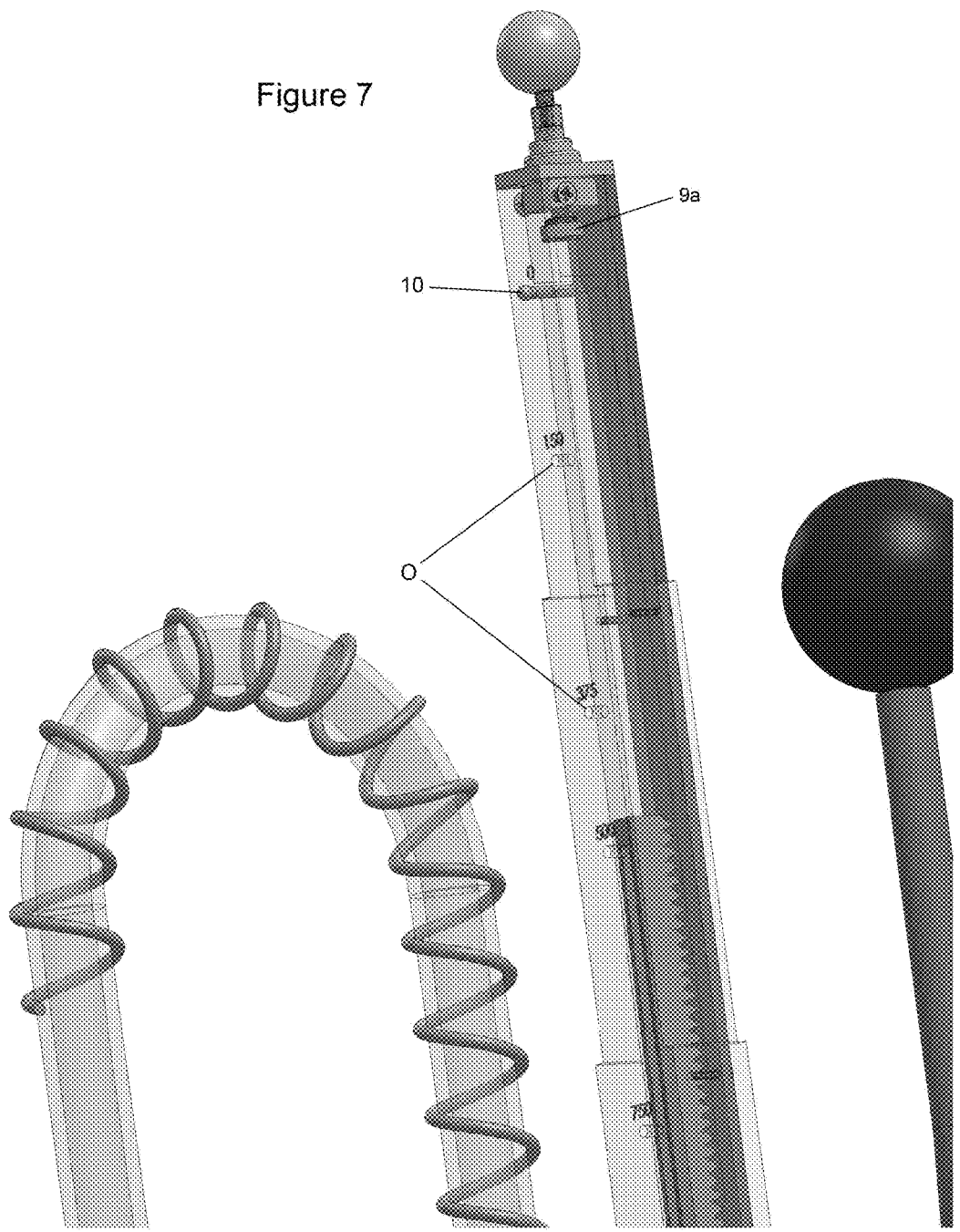
FIG. 7 is a partial schematic close-up view of the components of the calibration tower assembly of FIG. 6.

The pump assembly P is supported on a base 1 having three legs 2 extending to support a metering assembly M having a calibration assembly C, a gear assembly G and a filler assembly F, illustrated in FIGS. 1-7. As shown in FIGS. 4A and 5A, the metering assembly M includes a metering chamber 27 having a chamber base 26, positioned within a housing cylinder 4. The metering chamber 27 is closed at the top by the calibration tower base 5. Gussets 6 support the calibration assembly C on the tower base 5. The assembly C includes a calibration tower 7 having calibration positions O, a calibration adjuster 9 and a calibration pin 10, as in FIGS. 1, 6 and 7. As shown in FIGS. 4A, 5A and 7, the pin 10 is movable between the desired calibration positions O, shown marked as in FIG. 7 with the predetermined desired amount of fluid to be dispensed by the pump assembly P.

The metering chamber base 26 includes an opening for engagement with a pump check valve 14, having the ferrule 13 attached thereto, and provides fluid communication from the metering chamber 27 to the filling assembly F, via the pump check valve. The filling assembly F includes a filler base 15 interconnected with the metering chamber base 26, a flexible hose assembly 16, a filler handle assembly 17 and a filler height adjustment bar 18. The front of the bar 18 is adapted to attract and engage a magnet 8 within the handle assembly 17 for securing the hose assembly on the bar during dispensing and storage.

Placed within the metering chamber 27 is a piston 28 engaged for axial movement within the chamber 27 on a mechanical gasket. Fixed to the center of the top of the piston 28 is a piston rack 29. Connected to the piston rack 29 is a rack guide 30 for securing the piston rack and through which the piston rack exits through the calibration tower base 5 and into the calibration tower 7.

Upon exiting the metering chamber 27, the piston rack 29 engages the gear assembly G which enables manual operation of the pump assembly P using the handle 11. The gear assembly G is housed within a case 12. Engaged with and driving the piston rack 29 is a pinion gear 23, supported for rotating movement on a horizontal gear shaft 25. A rotating top gear 22 is supported on an opposite end of the horizontal gear shaft 25. A continuous gear chain 24 is supported on the top gear 22, and at an opposite end on a rotating handle gear 21, supported for movement on bearings within a gear bracket 19. The rotating handle gear 21 has a horizontal shaft engaged by bearings with the movable handle 11 for driving the piston and piston rack. The gear bracket 19 is secured to the metering assembly M by gear bracket screws 20.

Movement of piston rack 29 through the rack guide 30 and the calibration tower base 5 into the calibration tower 7 determines the predetermined volume of liquid to be dispensed by the System. Because the stroke length of the piston 28 determines the volume of liquid drawn into the metering chamber 27, the distance the rack travels up into the calibration tower 7 can be controlled by a metering or calibration pin 10 placed in one of multiple predetermined openings O found at the face of the calibration tower 7. Each opening corresponds to a desired measure of liquid, either in milliliters or ounces, and is marked with the liquid volume desired to be dispensed with the pin 10 in the specific opening O, as in FIG. 7. The calibration tower includes a calibration adjuster 9 which includes a handle interconnected by an adjustable screw and ending at a physical rack stop 9a located within the calibration tower for engagement by the piston rack, also shown in FIG. 7. The calibration adjuster 9 allows the rack stop 9a to be moved up or down in precise increments using the handle, should the need arise to adjust the stroke length of the piston rack 29. While the tolerances for the distances between the openings O in the calibration tower 7 are preferably +0.0 inches to −0.001 inches, in the event of unanticipated accumulated errors in the manufacturing of the pump, or accumulated wear in the operation of the pump and its moving parts such that its dispensing of precise, predetermined volumes decays in accuracy, the length of the travel of the piston rack may be shortened or extended by adjusting the rack stop up or down as needed to compensate for such inaccuracies. It should be understood that many of the components of the pump assembly P, as with the bulk container B, are preferably manufactured of stainless steel materials of the type used in connection with food production and sales. However, any appropriate food grade quality materials may be used.

The piston 28 is near the top of the metering chamber 27 when the handle 11 is vertical (the "default, upright" position), as shown in FIGS. 4 and 4A. In this upright default position, the metering chamber 27 beneath the piston 28 is engorged with liquid. As the handle 11 is drawn down, the gear assembly G rotates the gears 21, 22, 23 and chain 24 such that the piston rack 29 is driven downward into the metering chamber 27, as in FIGS. 5 and 5A. As the piston 28 drops in the metering chamber 27, the check valve 14 is opened to allow the liquid to enter into the chamber. The sanitary check valve 14a in the filler assembly F is also opened as the piston 28, by force of the handle, descends. When the piston rack 29 engages the calibration pin 10 in one of the preset openings O in the calibration tower 7, the piston ceases its descent and the sanitary check valve 14a closes. When the piston 28 again begins its ascent by upward force of the handle, the pump check valve 14 opens, allowing the liquid contained in the spear 43 and bulk container B below to enter the metering chamber 27. When the piston rack 29 engages the rack stop 9a, the handle 11 has reached its default upright position, the pump check valve 14 closes, and the entire metering chamber 27 beneath the piston 28 is once again engorged with liquid.

Figures 5, 5A:
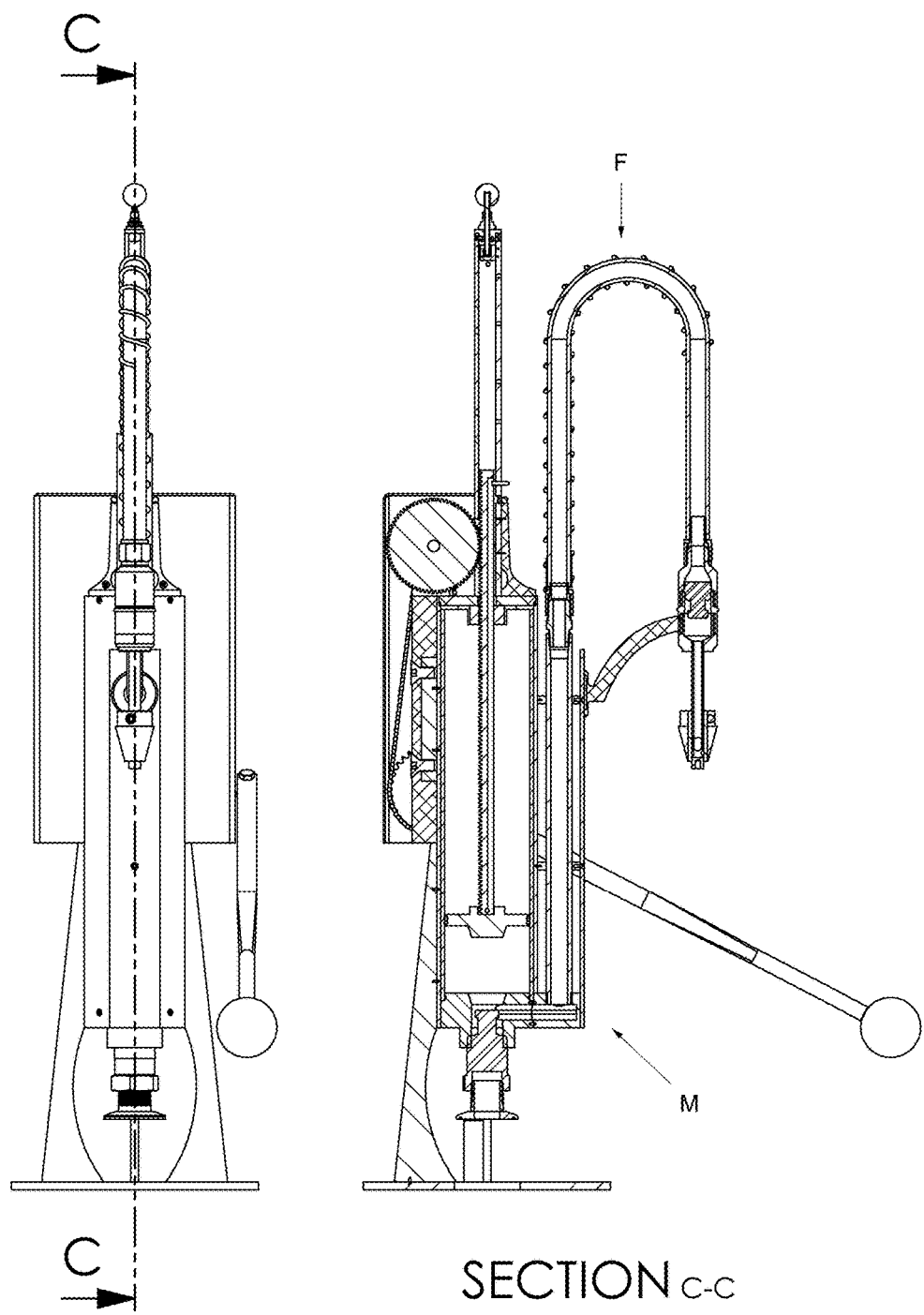
FIG. 5 is a front plan view of the pump assembly of FIG. 1, with the pump assembly in an operating position showing the downward movement of the handle and the downward movement of the piston either prior to filling of the metering chamber, or after emptying of the metering chapter, of the desired amount of liquid.
FIG. 5A is a schematic, front plan view of the pump assembly taken along the line C-C of FIG. 5.

Following installation of the pump assembly P on the barrel assembly B, the gas valve 61 may first be turned to an on position. Additionally, the calibration pin 10, which is preferably secured to the tower 7 by use of a lanyard (not illustrated), is removed from the top or 0 ml opening O location (the piston rack and piston's locked position), and allowed to hang at the side of the pump assembly P. To initially prime the metering chamber prior to filling with the desired fluid commodity to be dispensed, two alternate methods are provided. In one method, the pump assembly is self-priming, since a bleeder valve is provided above a check valve intermediate the filler handle 17 and the filler tip T. Upon depression of an optional bleeder valve (not illustrated), the metering chamber 27 is evacuated. The bleeder valve is released when fluid enters the filler handle 17. In a second and illustrated embodiment, the pump is primed using the handle 11. The handle 11 is moved to the downward or priming position, as in FIG. 5A, and the valve of the gas cylinder is turned on. The handle 11 is then raised approximately 30 degrees, and then lowered again to the priming position to evacuate all air within the pump assembly P. A small amount of fluid may be dispensed during the priming process. Following priming, the handle 11 is returned to its upright vertical position, whereupon movement of the handle biases the base pump check valve 14 open and the metering chamber 27 is then filled with liquid to be dispensed. With the handle 11 in the upright vertical position, the base pump check valve 14 is in a closed position. It should be understood that the check valves referred to and schematically illustrated in FIGS. 4A and 5A, are preferably commercially available high quality, food grade poppet valves or sanitary check valves, of the type available from Check-All Valve Mfg. Co., of West Des Moines, Iowa 50265. The pump assembly P is now ready for precision dispensing of the liquid.

To fill a small container W with a predetermined amount of the desired fluid from the metering assembly M, the metering or calibration pin 10 is placed in the opening marked with the corresponding desired volume of the bottle W to be filled. The bottle W may be held or placed within the drip tray 45 of the barrel assembly B. The filler handle 17 may be moved and a rubber or other compressible stopper included on the filler tip T may be placed within the bottle W to seal the bottle opening. Once the metering or calibration pin 10 is placed within the desired preset volume opening O, the metering pin 10 is engaged within a groove formed within the piston rack 29, and the handle 11 is moved downwardly as shown in FIG. 5, 5A. As the handle is moved downward, both the base pump check valve 14 and the sanitary check valve 14a within the filler assembly F adjacent the filler nozzle or tip T, are moved to open position under the operating pressure of the System and fluid flow. The metering pin 10 mechanically stops the handle 11 travel at a predetermined stroke length when the pin 10, within the groove of the piston rack, hits the top inside surface of the piston rack 29, as shown in FIG. 5A. FIGS. 6 and 7 illustrate the openings O and associated volume markings on the calibration tower 7. Such a mechanical stopping action within the calibration tower 7 enables the present System to accurately dispense exact amounts of predetermined, selected volumes of liquid on a repeated basis. In the illustrated embodiment, available small container volumes include 150, 375, 500, 750 and 1000 ml, the combinations of which enable the filling of a variety of conventionally available sizes of small containers. When the handle stops, the small container W is filled with the predetermined desired fluid volume.

When the handle is moved down, the piston 28 descends and the base pump check valve 14 is closed such that and liquid flows out of the metering chamber 27, thru the metering chamber base 26, through the filler base 15, and into the filler hose assembly 16 passing the sanitary check valve 14*a* into the filler tip T and then out into the container W. Once filled, the filler tip T may be removed from the bottle or container W, the filler handle assembly 17 is returned to a storage position, and the operator seals the container W. Each part that comprises the filling assembly is threaded or otherwise attached with an appropriate food quality seal to adjoining parts. The filler handle assembly 17 is attached to the main chamber magnetically, and permits movement of the assembly 17 for the filling of containers of varying heights. A case 12 covers all moving parts except the filler assembly F. A cam lock allows the handle assembly 17 to be locked in the default position when the pump assembly P is not in use.

Following filling of the small container W with the desired predetermined volume of fluid, the handle 11 is then returned to the default upright position by an operator. The upward pressure (applied by the vertical upward movement of the piston 28) causes additional fluid to enter the metering chamber 27 via the check valve 14 beneath the metering chamber such that the pump assembly P is refilled (in the illustrated embodiment to approximately 1,000 ml of liquid) and is ready for resetting of the calibration pin 10 for another preset, predetermined volume of fluid to be dispensed. In the event it is desired to fill a small container W having a larger volume than the volume of the metering chamber (greater than 1,000 ml, such as a magnum), the small container W is maintained in engagement with the filler tip T after the first filling is completed, and a second filling process is performed.

Once the barrel assembly B is emptied of its liquid, the gas valve 61 is closed. The pump assembly P is removed from the empty barrel assembly B and may be replaced upon another full barrel assembly. A sanitary clamp and cover are placed over the ferrule 44, and the barrel assembly B may be returned to the wholesaler or fluid supplier, where it is sanitized and refilled for reuse. A recharged gas cylinder 60 may also be replaced if needed.

It will be understood by one of ordinary skill in the art that the use of such a bulk or barrel sized container for filling consumer sized liquid beverage or wine containers, has particular environmental advantages with respect to the reuse of the consumer's container. Since relatively few consumers "library" their wines, a bottle filled (and refilled) at the grocery or other wine store having a re-sealable cap will allow the wine to stay fresh for at least several months, providing one doesn't empty some of the contents. Like any other bottle of wine, opening it and consuming some portion and then resealing it, results in spoilage of the liquid within in a week or two. But if the container is kept sealed after the initial filling from the bulk container, the small amount of air at the top of the wine will have little effect. A consumer purchasing wine to store for a longer period of time would be provided with the option of simply purging the air above the wine with a spritz of nitrogen or argon before sealing the top of the smaller container.

While the preferred embodiments of the invention System of this application, its components and method have been illustrated and described, it should be understood that variations will become apparent to those skilled in the art. Accordingly, the invention is not to be limited to the specific embodiments illustrated and described herein, but rather the true scope and spirit of the invention are to be determined by reference to the appended claims.

I claim:

1. A liquid dispensing system comprising,
   a) a bulk beverage container for maintaining liquid being pumped from a sealed and air tight environment, the bulk container having an opening for providing inert gas into the bulk container;
   b) a manually operated metering pump assembly positioned above the bulk beverage container and having a fluid interconnection with the bulk beverage container, a gear drive assembly for physically moving an interconnected handle wherein the metering pump assembly is manually movable between operating positions for filling a metering chamber, and emptying the metering chamber of a preset, predetermined amount of liquid;
   c) a second beverage container for receiving the preset, predetermined amount of liquid; and
   d) a nozzle for emptying the metering chamber to the second beverage container, for filling the second beverage container, the metering chamber having a size equal to the amount of desired liquid being dispensed, and where the nozzle and the second beverage are positioned above the bulk beverage container at a distance from the interconnected handle to enable manual movement of the handle adjacent the second beverage container.

2. The system of claim 1, wherein the metering pump assembly is a positive displacement pump.

3. The system of claim 1, wherein the liquid dispensing system is manually operated.

4. The system of claim 1, wherein the metering pump assembly includes a calibration tower having locations for selecting and setting the predetermined desired amount of liquid to be dispensed.

5. The system of claim 4, wherein the gear drive assembly includes a rack secured with a piston for moving liquid which is engaged within the metering chamber, and a pinion gear engaged with the rack for driving the gear drive assembly between operating positions upon manual movement of the interconnected handle.

6. The system of claim 5, wherein engagement of the rack and piston with a pin positioned at a location selected for setting the predetermined amount of liquid to be dispensed, stops movement of the rack, piston and handle, and empties the predetermined amount of liquid from the metering chamber through the nozzle.

7. The system of claim 1, wherein the bulk beverage container for maintaining liquid being pumped from a sealed and air tight environment includes a port accessing a single opening into an interior of the bulk beverage container by a supply tube, and supplying inert gas from an interconnected gas cylinder mounted on the bulk beverage container adjacent the port, to the interior of the bulk beverage container.

8. The system of claim 7, wherein the bulk beverage container is purged of air when the supply tube accessing the interior of the bulk beverage container is interconnected with the gas cylinder via a valve and a pressure regulator for controlling the supply of inert gas into the interior of the bulk beverage container.

9. The system of claim 8, wherein the supply tube accessing the interior of the bulk beverage container is interconnected with the gas cylinder via a valve and a pressure regulator for controlling the supply of inert gas into the interior of the bulk beverage container to maintain atmospheric pressure within the bulk beverage container.

10. The system of claim 1, wherein the metering pump assembly is manually movable between operating positions by vertically moving the interconnected handle in a vertically upward direction for filling a metering chamber, and a vertically downward direction for emptying the metering chamber through the nozzle to a reusable second beverage container, initially unsealed, and positioned within a retail environment.

11. The system of claim 1, wherein the metering pump assembly is manually movable between operating positions by vertically moving the interconnected handle in a vertically upward direction for filling a metering chamber, and for emptying the metering chamber through the nozzle to a reusable second beverage container of a predetermined desired volume, by a single vertically downward directed movement.

12. The system of claim 1, wherein the metering pump assembly is manually movable between operating positions by vertical movement of the interconnected handle.

13. The system of claim 12, wherein the interconnected handle of the metering pump assembly moves in a vertically upward direction for filling a metering chamber of a predetermined desired volume.

14. The system of claim 13, wherein the interconnected handle of the metering pump assembly moves in a vertically downward direction for emptying the metering chamber through the nozzle to a reusable second beverage container of a predetermined desired volume.

15. A method for dispensing liquid from a bulk beverage container to a smaller reusable beverage container comprising the steps of:
 a) interconnecting the bulk beverage container with a positive displacement pump located above the bulk container, the positive displacement pump having a calibration pin for setting a desired volume of liquid to be dispensed to a smaller reusable beverage container which is unsealed immediately prior to filling;
 b) priming a metering chamber within the positive displacement pump with liquid to be dispensed;
 c) setting the calibration pin at the desired volume setting to dispense the predetermined amount of liquid into a smaller reusable beverage container;
 d) manually moving an interconnected handle in a single vertical motion to drive the predetermined amount of liquid from the metering chamber within the positive displacement pump via a check valve into the smaller, reusable beverage container, via a nozzle engaged with the smaller beverage container and located substantially adjacent the metering chamber, above the bulk beverage container; and
 e) stopping manual movement of the handle upon engagement of a rack within the positive displacement pump with the calibration pin.

\* \* \* \* \*